Jan. 23, 1934. T. M. DE LA GARDE 1,944,500
COMBINED INTERMITTENT CLAW FEED FILM MOVEMENT AND FILM PRESSURE RELEASE
Filed April 22, 1932 2 Sheets-Sheet 1
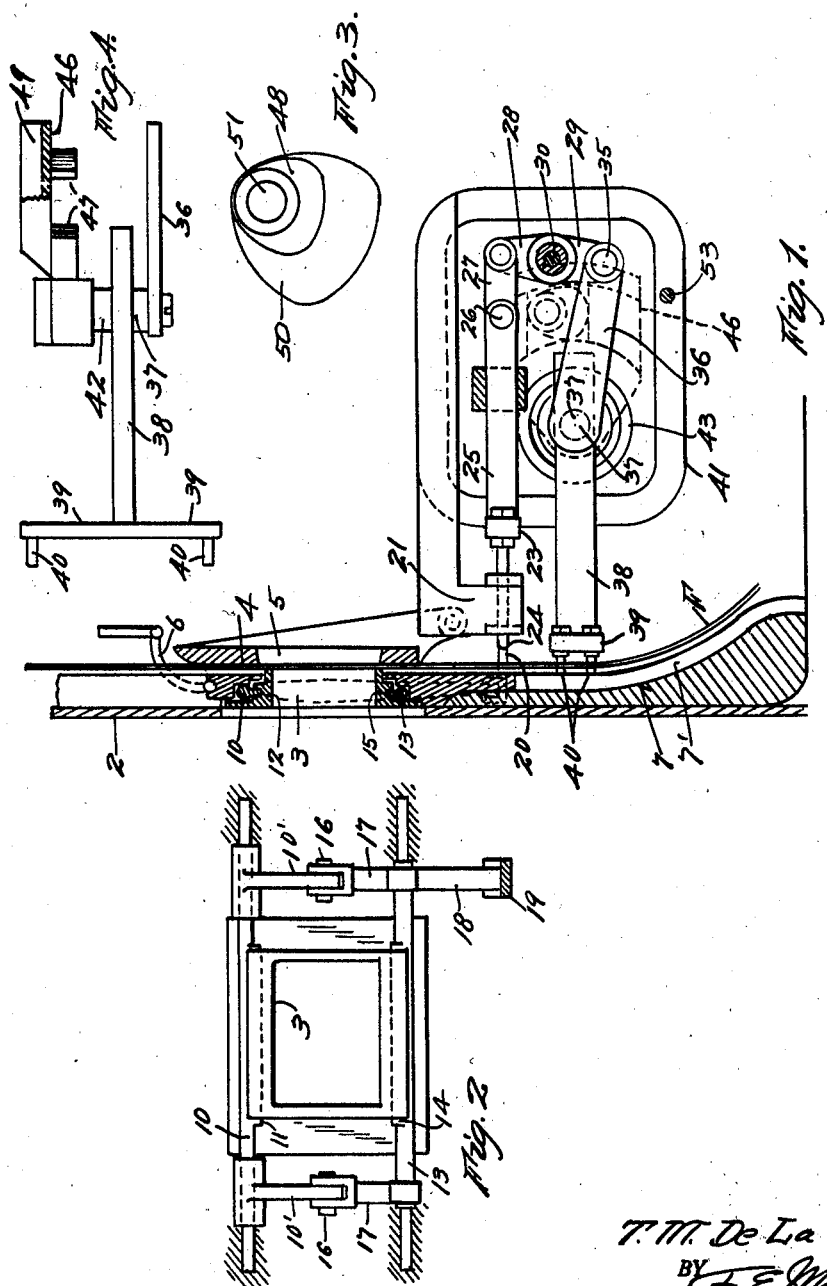
INVENTOR,
T. M. De La Garde,
BY
F. E. Maynard
ATTORNEY Jan. 23, 1934.    T. M. DE LA GARDE    1,944,500
COMBINED INTERMITTENT CLAW FEED FILM MOVEMENT AND FILM PRESSURE RELEASE
Filed April 22, 1932    2 Sheets-Sheet 2
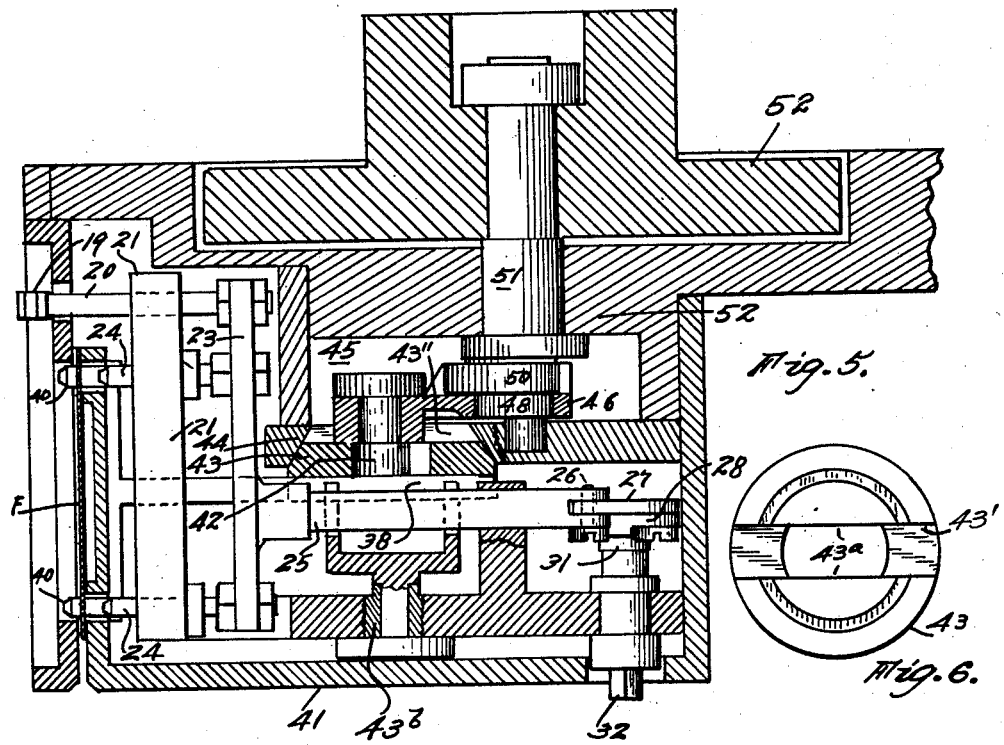
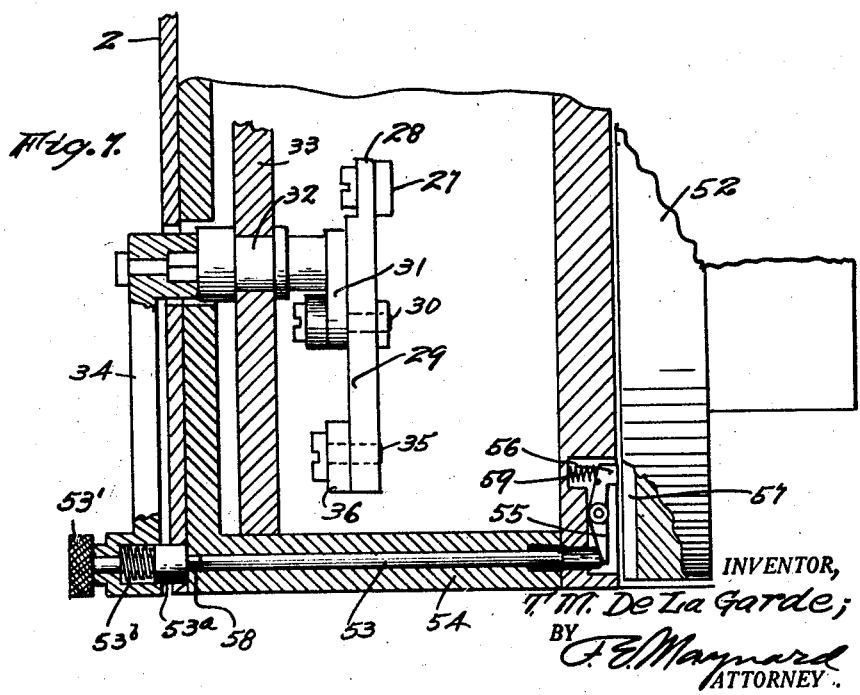
INVENTOR,
T. M. De La Garde;
BY
F. E. Maynard
ATTORNEY.

Patented Jan. 23, 1934

1,944,500

UNITED STATES PATENT OFFICE 1,944,500

COMBINED INTERMITTENT CLAW FEED FILM MOVEMENT AND FILM PRESSURE RELEASE

Theodor M. De La Garde, Los Angeles, Calif., assignor of three-fourths to Thomas L. Tally, Beverly Hills, Calif.

Application April 22, 1932. Serial No. 606,818

13 Claims. (Cl. 88—18.4)

This invention relates to apparatus in which a motion picture film is caused to travel continuously in intermittent steps under constant control of a feed movement, which in the present disclosure is of the claw feed class.

In apparatus of this kind, and especially in motion picture cameras, it is desirable to protect the film from undesired pressure as it passes through an aperture guide and past an aperture plate and it is an object of the present invention to provide a method and means for relieving the film of pressure during its periods of advancing movement and to provide for the firm holding of the film at the aperture plate during its pauses.

In this connection it is an object to provide for concurrent action of pressure control means with action of the intermittent action claw means.

It is further an object to provide a film movement mechanism in which operating parts are enclosed in a leak proof chamber to contain a constant supply of lubricant therefor.

It is a further object to provide means for retracting pilot pins of the feed movement to facilitate threading of the film in the movement.

More specifically it is an object to provide a camera aperture plate adapted to be bodily shifted to and from the film so as to hold it in the idle periods and to relieve the film from pressure during its feeding.

The invention consists in certain advancements in this art as set forth in the ensuing disclosure and has, with the above, additional objects and advantages as hereinafter developed, and whose construction combination and details of means, and in manner of operation will be made manifest in the description of the herewith illustrative embodiment; it being understood that modifications, variations, and adaptations may be resorted to within the scope, principle and in the spirit of the invention as it is more directly claimed hereinafter.

Figure 1 is a face elevation and partial section of the movement and aperture plate structure, showing pilot pins retracted and register pins projected as to a film. Figure 2 is an inside elevation of the aperture plate and supports. Figure 3 is a side elevation of the movement cam. Figure 4 is a plan, partly in section, of the register shuttle. Figure 5 is a horizontal section of the movement with parts in plan. Figure 6 is an end face of a rocking bearing of the shuttle mechanism. Figure 7 is a detail of a manual pilot pin retractor and lock therefor.

A portion of the front 2 of a camera is shown as having an aperture plate 3 forming a feature of the present invention. This aperture plate is mounted for movement to and fro to parallel positions with respect to a back plate 4 having an aperture 5 coinciding with the aperture of the front or aperture plate 3. The back plate 4 is adapted for movement to and from a film F passing in intermittent steps between the front plate 3 and the back plate 4 which latter is adapted to be locked by a suitable latch 6 and its normal position in the film race 7.

It is desirable to shift the front plate 3 with timed relation to the idle and feeding periods of the film F and a proved means for accomplishing the desired action is shown as including an upper transverse spindle 10 having an elongated bottom bead 11 engaging in a slot 12 along the top of the front plate 3 and also including a bottom spindle 13, having an upper bead 14 engaging in a slot 15 along the bottom of the front or aperture plate 3.

The upper spindle 10 is supported in suitable bearings in the camera structure 2 and has downwardly extending arms 10' which are connected by pivots 16 in the upper ends of arms 17 which are secured on the lower spindle 13.

The lower spindle 13 is provided with a lever arm 18 which is here shown as being a continuation of one of the arms 17. This arm is oscillated by the head 19 of a push bar 20 which extends through a frame element 21 and is connected to a cross head 23 which is provided with a pair of pilot pins 24 which are guided in the frame element 21.

The cross head 23 has a shank 25 extending rearwardly therefrom and connected by a pivot 26 to a link 27 attached pivotally to the upper end 28 of a lever 29 which is clearly shown in Figure 7 as being medially on a pivot 30 provided on the lower end of a crank 31 whose shaft 32 is supported in a frame element 33 and has fixed to its outer end a handle 34.

The object of such crank mounting of the lever 29 is provided for bodily tilting the lever on a pivot 35 which connects at its lower end to a connecting link 36. It will be seen that the manually controlled handle 34 may throw the crank 31 and thereby pull back the link 27 and the attached pilot pin device (25—23—24) as a unit, to draw the pilot pins back to facilitate threading of the film.

The link 36 pivoted on a trunnion 37 fixed on a shuttle arm 38 on whose forward end is fixed a cross-head 39 provided at its ends with vertical pairs of register pins 40 which sweep in slots 7' provided in the film race 7 and adjacent to which race the film movement mechanism is disposed in a suitable casing 41, Fig. 5. The register shuttle arm 38 has a trunnion 42 coaxial with the trunnion 37 and which trunnion 42 slideably works in the oscillating bearing 43, Fig. 6 which has a conical rear seat in a bearing 44 so as to provide an oil tight seal for a chamber 45 in which there operates an oscillating arm 46, Fig. 4, fixed on the shuttle arm 38. The lever 46 has front concentric cam receiving faces 47 matching a cam 48, Fig. 3 while the rear of the arm 46 is provided with a cam-way 49 to receive a complementary cam 50 forming with the cam 48 a compound cam unit fixed on a main action driving shaft 51 mounted in a bearing portion 52 of the frame of the portion 41. The outer end of the cam shaft 51 is provided with a fly wheel 52 motion being imparted to the cam shaft in desired manner.

The peculiar cam device 48—50 and its cooperative lever arm 46 is found to impart a highly desirable orbital movement or cycle to the register pins 40 so that they engage with and retract from the film in an advantageous manner.

The oscillating bearing 43 has in its front face a diametrical slot 43' in which the shank 38 is slideably fitted and the opposite face of the bearing 43 has a like diametrical slot 43" in which the hub of the lever 46 is slideably fitted. The action of the cam device is to reciprocate the trunnion 42 in the elongated opening 43ᵃ of the bearing 43 while this oscillates due to the action of the lever arm 46 and which is rigidly connected to the register shuttle arm 38 which has only sliding movement in the bearing 43.

It will be seen that motion reciprocating movement is transmitted by the trunnion 37 to the link 36 which oscillates the lever 29 and this in turn reciprocates the link 27 and thereby reciprocating the pilot shank 25.

When the pilot pins have been registered with the film F this is standing idle for an instant and at this time the pilot device connection 20 acts through its head 19 to oscillate the supporting spindles 10—13 and through their heads 11—14 are pressing the front of aperture plate 3 against the film F and this is pressed against the supporting back plate 4 which is in supporting position.

The movement of the aperture plate 3 is concurrent with the movement of the pilot pins 24 and just as they retract from the film F to permit it to advance in the race the aperture plate is shifted by its supporting spindle 10—13 away from the film so that all pressure is relieved therefrom during all of its advancing steps.

In order to thread the film into the race the pilot pins must be manually retracted at a moment when the register or claw pins 40 are free from the film or race-way and means are here provided to permit the manual retraction of the pilot pins only at such moments of register pin release. This means includes a bolt 53, Fig. 7 mounted in a frame element 54 and whose inner end normally engages a trigger 55 pivoted in the frame structure and having a nose 56 adapted to enter a slot 57 provided therefor in the adjacent face of the fly wheel 52. A light spring 59 exerts itself to press the nose of the trigger 55 into the fly wheel slot 57 when the latter registers with the trigger nose end as and when the bolt 53 permits such action. Hence if it is desired to thread the film into the camera the operator pulls outwardly on a finger knob 53' provided on the lower end of the handle 54 and retracts the head 53ᵃ against the action of a spring 53ᵇ, in the arm 34, so as to draw a locking pin 58 from the bolt hole which receives the bolt 53 and allows the spring 59 to press the trigger nose against the nearby face of the wheel 52 and as the trigger slot 57 therein runs into position at the trigger the latter will drop into the wheel and lock it. The slot 57 is located in the wheel in timed relation to the claw movement at that period when the register pins 40 are out of the film race. When the operator throws the handle arm 34 to rock the lever 29 and retract the pilot pins the latch pin 58 is temporarily engaged with the casing 2 in its new position and is returned to normal bolt setting position when it is desired to press in the bolt 53 and clear the trigger 55 from the timing slot 57. It will be seen that the chamber 45 can be provided with a suitable lubricant for the cam device and cooperative parts, the chamber being, as above stated, sealed to prevent leakage.

The oscillating bearing 43 is pressed to its seat by jack screw device 43ᵇ.

What is claimed is:

1. In apparatus of the class described, a back plate, and an aperture plate parallel thereto, and vertically spaced rocker shafts respectively operatively engaging and supporting the top and the bottom of the aperture plate, and means for concurrently rocking said shafts in opposite directions to move the latter plate toward or from the former.

2. In apparatus of the class described, a back plate, and an aperture plate, and spaced parallel rocker shafts between and in the plane of which said aperture plate is disposed and has interlocking supporting connection along parallel parts, and means for concurrently oscillating said shafts and thereby shift the aperture plate toward or from the front plate.

3. In mechanism of the class described; a pair of oscillative parallel rock shafts, and an aperture plate between and in the plane of and wholly supported by said shafts; the latter having operative connection with and whereby the plate is bodily shifted in planes parallel with the plane of the shafts.

4. In mechanism of the class described; a pair of oscillative parallel rock shafts, and an aperture plate between and in the plane of and wholly supported by said shafts; the portions of the shafts contiguous to the said plate having a mortise and tennon connection with the plate; whereby the latter is shifted between planes parallel to that of the shafts by shaft action.

5. In mechanism of the class described; an aperture plate, and a pair of spaced parallel rock shafts between which the plate is arranged and by which it is wholly supported and said shafts having operative interlocking connections with contiguous edges of said plate and whereby it is shifted to positions parallel to the plane of the shafts.

6. In mechanism of the class described; a movement casing provided with a sealed oil chamber, drive means operative in said chamber, shuttle means in said casing and exterior of the chamber, an oscillative, sealing disc for the chamber having a slide-way and said shuttle means including a member slidably mounted in said slide-way and operatively connected to said drive means in said chamber.

7. In mechanism of the class described; a flywheel and its shaft, a shuttle device actuated by the shaft and including a pilot pin, manually operative flywheel locking means and means on said flywheel for engagement with said locking means to stop the flywheel and the shuttle at a predetermined position, said last named means being so positioned on the flywheel that locking of the flywheel takes place only when the shuttle is in a retracted position in its cycle.

8. In a mechanism of the class described; a flywheel and its shaft, a shuttle device actuated by the fly wheel shaft and including a pilot pin, and means engaging the fly wheel to lock the shuttle in a retracted position in its cycle; said means including a manual crank connected with and adapted to retract the pilot pin, a bolt set by a part of said crank when the latter is in one position, and a latch which releases the wheel while the bolt is in set position and which holds the wheel in a given position during retraction of the shuttle, at will.

9. In mechanism of the class described; a drive shaft, a cam device fixed on the shaft, an oil chamber in which the cam operates, a shuttle device exterior of the chamber, an operative connection uniting said device and said cam, and a working seal for said chamber and through which said connection operatively passes said seal comprising a disc having a conical bearing face for its relative seat and a jack screw pressing the disc to its seat.

10. In mechanism of the class described; a drive shaft, a cam device fixed on the shaft, an oil chamber in which the cam operates, a shuttle device exterior of the chamber, an operative connection uniting said device and said cam, a working chamber seal through which said connection operatively passes, and means for pressing said seal to its seat, and comprising a jack screw coaxially arranged with said seal.

11. In mechanism of the class described; a feed and pilot pin movement including a reciprocative and oscillative shuttle, a drive cam, an oil chamber in which the latter works, an oscillative bearing for the shuttle constituting a movable seal for said chamber and having a transverse slideway across its outer face in which said shuttle reciprocates, and means passing through said bearing and operatively connecting the cam and the shuttle to reciprocate and oscillate the shuttle.

12. In mechanism of the class described; an aperture plate, having channeled top and bottom margins and a pair of oscillatively mounted rock shafts connected for concurrent action and engaged in said margins and provided with means whereby the plate is bodily shifted from one position to another on the axis of the plate aperture.

13. In mechanism of the class described; a pilot pin system, means to reciprocate the pin system, an aperture plate, a pair of oscillative rock shafts engaging, operatively, the top and bottom portions of the plate, and means connecting said shafts and actuated by said pin system, whereby to oscillate the said shafts.

THEODOR M. DE LA GARDE.